United States Patent [19]
Rierden et al.

[11] Patent Number: 5,978,577
[45] Date of Patent: Nov. 2, 1999

[54] METHOD AND APPARATUS FOR TRANSACTION PROCESSING IN A DISTRIBUTED DATABASE SYSTEM

[75] Inventors: William Rierden, Evergreen; Mark Marusin; David Gollob, both of Highlands Ranch, all of Colo.

[73] Assignee: CSG Systems, Inc., Englewood, Colo.

[21] Appl. No.: 08/405,766

[22] Filed: Mar. 17, 1995

[51] Int. Cl.[6] ................................................. G06F 17/30
[52] U.S. Cl. .......................... 395/610; 395/603; 395/604; 395/611; 395/200.32; 395/200.33; 379/115; 340/825.52
[58] Field of Search ..................................... 395/600, 200, 395/275, 603, 604, 610, 611, 200.31, 200.33; 340/825.52; 379/115

[56] References Cited

U.S. PATENT DOCUMENTS

| | | | |
|---|---|---|---|
| 4,651,279 | 3/1987 | Suzuki | 395/218 |
| 4,694,396 | 9/1987 | Weisshaar et al. | 395/200.3 |
| 4,714,996 | 12/1987 | Gladney et al. | 395/619 |
| 4,757,267 | 7/1988 | Riskin | 379/113 |
| 4,853,843 | 8/1989 | Ecklund | 395/619 |
| 4,858,120 | 8/1989 | Samuelson | 395/211 |
| 4,864,497 | 9/1989 | Lowry et al. | 395/613 |
| 4,875,206 | 10/1989 | Nichols et al. | 370/427 |

(List continued on next page.)

FOREIGN PATENT DOCUMENTS

| | | |
|---|---|---|
| 501701 | 9/1992 | European Pat. Off. . |
| 625756 | 11/1994 | European Pat. Off. . |

OTHER PUBLICATIONS

Computer Associates advertisement for CA–OpenIngres in *Business Week* magazine, Dec. 19, 1994.

*Primary Examiner*—Thomas G. Black
*Assistant Examiner*—Cheryl R. Lewis
*Attorney, Agent, or Firm*—Baker & McKenzie

[57] ABSTRACT

A subscriber management system includes at least one Data Directory Server (DDS) located between one or more transaction generators and one or more data servers. The DDS efficiently routes transactions and provides data location functions. The DDS provides high data availability, high on-line transaction rates, batch capabilities, scalability and maintainability. In particular, based upon internal rules within the DDS and the particular transaction type, the DDS routes transactions to the appropriate server(s). Transactions are classified according to where they may be executed. Specifically, transactions may be classified as SPECIFIC, ANY or ALL. A SPECIFIC transaction must be processed at one or more specific servers irrespective of the accompanying arguments. An ANY transaction may be processed at any of the enterprise servers and selection is made randomly. Finally, an ALL transaction requires sequencing through each of the data servers within the enterprise and repetitively performing the transaction.

14 Claims, 6 Drawing Sheets

U.S. PATENT DOCUMENTS

| | | | |
|---|---|---|---|
| 4,882,674 | 11/1989 | Quint et al. | 395/684 |
| 4,893,302 | 1/1990 | Hemmady et al. | 370/427 |
| 4,894,824 | 1/1990 | Hemmady et al. | 370/380 |
| 4,896,319 | 1/1990 | Lidinsky et al. | 370/427 |
| 4,897,874 | 1/1990 | Lidinsky et al. | 380/3 |
| 4,899,333 | 2/1990 | Roediger | 370/427 |
| 4,922,486 | 5/1990 | Lidinsky et al. | 370/427 |
| 4,953,204 | 8/1990 | Cuschleg et al. | 379/266 |
| 5,005,122 | 4/1991 | Griffin et al. | 395/200.33 |
| 5,113,496 | 5/1992 | McCalley et al. | 395/306 |
| 5,163,131 | 11/1992 | Row et al. | 395/200.32 |
| 5,167,035 | 11/1992 | Mann et al. | 395/182.02 |
| 5,200,993 | 4/1993 | Wheeler et al. | 379/93.02 |
| 5,218,676 | 6/1993 | Ben-Ayed et al. | 395/200.7 |
| 5,218,697 | 6/1993 | Chung | 395/200.6 |
| 5,222,120 | 6/1993 | McLeod et al. | 379/88 |
| 5,230,072 | 7/1993 | Smith et al. | 395/604 |
| 5,245,608 | 9/1993 | Deaton, Jr. et al. | 370/469 |
| 5,247,664 | 9/1993 | Thompson et al. | 395/610 |
| 5,253,342 | 10/1993 | Blount et al. | 395/200.62 |
| 5,257,369 | 10/1993 | Skeen et al. | 395/680 |
| 5,263,158 | 11/1993 | Janis | 395/601 |
| 5,263,165 | 11/1993 | Janis | 395/490 |
| 5,265,250 | 11/1993 | Andrade et al. | 395/671 |
| 5,274,806 | 12/1993 | Hill | 395/610 |
| 5,276,879 | 1/1994 | Barry et al. | 395/676 |
| 5,276,901 | 1/1994 | Howell et al. | 395/603 |
| 5,283,731 | 2/1994 | Lalonde et al. | 395/201 |
| 5,287,103 | 2/1994 | Kasprzyk et al. | 340/825.52 |
| 5,287,461 | 2/1994 | Moore | 395/275 |
| 5,289,371 | 2/1994 | Abel et al. | 395/205 |
| 5,291,550 | 3/1994 | Levy et al. | 379/242 |
| 5,307,495 | 4/1994 | Seino et al. | 395/676 |
| 5,313,581 | 5/1994 | Giokas et al. | 395/200 |
| 5,313,646 | 5/1994 | Hendricks et al. | 395/612 |
| 5,325,290 | 6/1994 | Cauffman et al. | 395/234 |
| 5,325,527 | 6/1994 | Cwikowski et al. | 395/200.52 |
| 5,329,619 | 7/1994 | Pagé et al. | 395/200.33 |
| 5,341,474 | 8/1994 | Gelman et al. | 395/200.36 |
| 5,341,476 | 8/1994 | Lowell | 395/200.49 |
| 5,341,477 | 8/1994 | Pitkin et al. | 395/200.56 |
| 5,345,556 | 9/1994 | Zapisek | 395/200.74 |
| 5,345,586 | 9/1994 | Hamala et al. | 395/610 |
| 5,347,632 | 9/1994 | Filepp et al. | 395/200.32 |
| 5,353,412 | 10/1994 | Douglas et al. | 395/200.73 |
| 5,355,453 | 10/1994 | Row et al. | 395/200 |
| 5,404,523 | 4/1995 | Dellafera et al. | 395/671 |
| 5,414,812 | 5/1995 | Filip et al. | 395/614 |
| 5,446,886 | 8/1995 | Li | 395/602 |
| 5,452,450 | 9/1995 | Delory | 395/610 |
| 5,459,860 | 10/1995 | Burnett et al. | 395/612 |
| 5,463,774 | 10/1995 | Jenness | 395/610 |
| 5,469,497 | 11/1995 | Pierce et al. | 379/115 |
| 5,481,700 | 1/1996 | Thuraisingham | 395/609 |
| 5,551,027 | 8/1996 | Choy et al. | 395/617 |
| 5,581,749 | 12/1996 | Hossain et al. | 395/600 |

SERVER A

| CUSTOMER | CUSTOMER | PROJECT | PROMOTION |
|---|---|---|---|
| 100014<br>Smith, Joe R.<br>070465<br>1244 Cherry Dr.<br>Newtown<br>Massachusetts<br>6174336633<br>BAS, HBO, SHO<br>$33.45<br>PPV(1a) $10.45<br>BOS34A | 100017<br>Purcell, Red L.<br>093054<br>17 Elm Street<br>Tucson<br>Arizona<br>6023459876<br>DLX, ESPN<br>$29.86<br>AZ67E | HBO<br>$10.95<br>BOS34A | ESPN<br>INSTALL FREE<br>ORDER BY 3/10/95<br>AZ67E |

SERVER B

| CUSTOMER | CUSTOMER | PROJECT | PROMOTION |
|---|---|---|---|
| 200028<br>Peters, Edward<br>030938<br>467 Charles Ave.<br>Pennington<br>Texas<br>2148974530<br>BAS<br>$10.49<br>TEX29P | 200041<br>Adams, Stan L.<br>111249<br>612A Pine Rd.<br>Denver<br>Colorado<br>304119000<br>SUP, VH1<br>$19.99<br>CO11P | HBO<br>$10.95<br>BOS34A | ESPN<br>INSTALL FREE<br>ORDER BY 3/10/95<br>AZ67E |

SERVER C

| CUSTOMER | CUSTOMER | PROJECT | PROMOTION |
|---|---|---|---|
| 400067<br>Redmond, Joe T.<br>012161<br>21 Columbia Ave.<br>Washington<br>District of Columbia<br>2026780101<br>DLX, CIN, SHO<br>$41.45<br>DCR45A | 400098<br>Friar, Tucker P.<br>082163<br>13 Mocking Lane<br>Tucson<br>Arizona<br>6025601234<br>BAS, SPC<br>$21.98<br>AZ67E | HBO<br>$10.95<br>BOS34A | ESPN<br>INSTALL FREE<br>ORDER BY 3/10/95<br>AZ67E |

FIG. 5

METHOD AND APPARATUS FOR TRANSACTION PROCESSING IN A DISTRIBUTED DATABASE SYSTEM

BACKGROUND OF THE INVENTION

1. Field of the Invention

The present invention relates generally to a method and system for processing transactions in a distributed database system.

2. Background of the Invention

With the increasing demand for the rapid processing of transactions, as well as the ever-increasing size of databases that these transactions must be processed against, many have turned to distributed database systems to accomplish their goals. For purposes of this disclosure, the term "distributed database" shall refer to a database system in which data is located in more than one physical location and/or in more than one database. In some cases, data may be distributed such that certain data is located in only one database while other data is located on more than one database. Usually, more than one client or user needs to access the data at the same time. Typically, many users require simultaneous or near simultaneous access. This presents a problem in that only a limited number of access requests can be processed at a time.

Access requests to databases generally are one of two types. The first is termed a "query" and is associated with a request to read data from the database(s). The second is termed an "update" and is associated with a request to write data to the database(s). For purposes of this discussion, both types of requests (and combinations thereof) shall be referred to generally as a "transaction." It is to be understood, however, that a transaction may involve one or more of either or both types of requests.

Various problems exist with distributed database systems. For example, in some cases multiple clients or users may request access to particular data at the same time. Typically, each data server may process one transaction (or a series of transactions) at a time. Thus, if multiple requests are made to one server at the same time, not all of the transactions can be processed at the same time. When this occurs the latter requests are generally queued or have to be resubmitted at a later time. This causes undesirable delays in the processing of these transactions. Other factors also contribute to delays in processing such transactions. As a result, in some cases, one or more data servers may be idle while another is backlogged with multiple requests. This is obviously an inefficient use of resources.

In an attempt to address these types of problems, some systems have used different schemes to attempt to balance the distribution of requests among the multiple servers. According to one arrangement, particular clients or users are permanently associated with particular servers. The theory behind this design is that by randomly limiting the number of clients accessing a particular data server, some minimization of the bottleneck effect may occur. According to another approach, multiple copies of particular data are stored in more than one database.

These schemes, however, generally suffer from at least three drawbacks. Firstly, many of the systems electing the first scheme are architected so that particular clients are "hard-wired" to particular servers. In such a case, clients in the system will not generally have access to the full complement of servers available in the system which are capable of processing the particular transaction. As a result, uneven load distribution may still occur since a server which is free to service a request may not be called upon to do so since the requesting client may not have access to the free server.

A second major drawback to both of the prior art data distribution schemes described above is the significant time and cost of processing information which is necessary to determine the best way to allocate data requests. In some cases, particularly when the number of transactions to be processed is low and the complexity of the allocation scheme is high, the system performs more efficiently without a real-time decisional process.

Thirdly, in the case of distributed database systems containing redundant data (e.g. the second scheme), the availability of secondary storage (i.e. disk storage) is significantly decreased by virtue of the redundancy of the data. Often data redundancy is not a possibility because of severe limitations in storage capacity within an enterprise.

One particular industry having a great need for storage and manipulation of large amounts of data is the telecommunications industry and particularly the cable television industry. Cable system operators typically maintain large databases containing a variety of subscriber, product and billing information. Typical classes of information managed by cable companies include subscriber accounts, available products and their pricing structure, physical assets and their functionality and marketing data. It is often desirable to distribute this information across a network of databases whether or not they are located at the same physical location.

The processing requirements for cable based systems can be staggering. For example, it may be necessary to provide 24 hour a day, 7 day a week service for a subscriber base of millions or tens of millions of subscribers. In addition, such a system may be called upon to execute hundreds or thousands of transactions per second (UPS). In addition, such systems may be required to support thousands of interactive users operating client terminals (e.g. Customer Service Representatives (CSRs)) many of which may be concurrent users. It is farther anticipated that the average customer record may soon be on the order of 15 kilobytes requiring a total database capacity of about 225 Gigabytes (assuming 15 million subscribers).

A typical prior art distributed database system that may be employed by a system operator includes a plurality of transaction generators or terminals which may be operated by CSRs to acquire access to data contained within the system. Each of the transaction generators communicates either directly or through a communications controller with a particular associated server or servers. Communication techniques and protocols which are known in the art are employed to allow the transaction generators to communicate with the servers. For example, Etherne™ may be used when both client and server are PC-based processors.

In prior systems, difficulty arises when access to data residing at differing locations is required. This places a burden on the CSR (or a transaction generator in general) because it may impose additional processing requirements to keep track of what data is accessible to a particular CSR and which is not. Additionally, if certain data is needed, but not accessible to a particular CSR, it may be necessary to determine where the data is located and which CSR may have access to that data.

An example of such a system exhibiting the drawbacks described above may include four data processing centers to support a national cable system operator. Each of four geographical regions in the United States (e.g. Northeast, Southeast, Midwest and West) may be supported by one of the four data processing centers. In such a case, all records for customers of the system operator who reside in Pennsylvania would be stored at the Northeast data center in its associated database. In the event that a particular Pennsylvania subscriber is at home and desires to receive information about his or her account the process is relatively simple. The subscriber may call in to a CSR operating a transaction generator connected with the Northeast database. The CSR, using the transaction processor, can simply generate a request for information regarding that subscriber. Alternatively, the subscriber may call in to an Automatic Response Unit (ARU) having an Automatic Number Indicator (ANI) interface and a similar request for information would be generated automatically.

The problem, however, arises when the same Pennsylvania subscriber also maintains a business account across the border in Ohio. Even though both accounts are serviced by the same system operator, a single call by the Pennsylvania/Ohio subscriber will not permit him or her to receive information about both accounts. This is because the Ohio account information will be located at and serviced by the Midwest data center. Since the transaction processor at the Northeast data center has no connection to the Midwest data base and since the transaction processor at the Midwest data center has no connection to the Northeast data base, the subscriber is forced to first call the Northeast data center for information about the residential account and then the Midwest data center for information about the business account. In addition, this subscriber is likely to receive two separate billing statements, one from each data center.

An additional drawback with this hypothetical system becomes evident when it is necessary to obtain system wide data. For example, a system operator may desire to retrieve data based upon subscriber demographics. Suppose, for example, the marketing department wishes to generate an alphabetical list of the names and addresses of all subscribers, system wide, who are over the age of 30 and subscribe to ESPN. It is necessary, using the above described system, to seperately access data within each of the four regions. Once data from each of the regions is gathered, it is further necessary to merge the data originating from each of the regions to generate one comprehensive list. The problems which are illustrated in this example are exacerbated when more than four data processing centers are used.

The method of distribution of customer records in the above example is known in the art as horizontal data distribution. In the above case, each of the customer records is completely contained on one physical server while the whole of its associated database and the enterprise domain of all customers is spread across all servers. It is also possible to distribute data in a vertical manner wherein different aspects of a customer's account resides on different physical servers.

SUMMARY OF THE INVENTION

In view of these and other drawbacks of the prior art, there is a need for a distributed data base system capable of handling large numbers of transactions in a short period of time and in an efficient manner. It is further desirable that the system be flexible, expandable, and cost efficient.

It is therefore an object of the current invention to overcome the above described and other drawbacks of the prior art.

It is a further object of the current invention to provide a distributed database system capable of high speed transaction processing.

It is a yet further object of the invention to allow database access while eliminating the need for time consuming processes normally associated with such access.

It is a still further object of the invention to provide server selection based upon a rules base allowing fast and efficient access to distributed information.

It is an even further object of the present invention to provide a distributed database system in which particular servers may be designated for the servicing of requests based upon the nature or type of request to be serviced.

According to one embodiment of the invention, these and other objects of the invention are achieved through the use of at least one Data Directory Server (DDS) located between one or more transaction generators and one or more data servers. The DDS efficiently routes transactions and provides data location functions. The DDS provides high data availability, high on-line transaction rates, batch capabilities, scalability and maintainability. In particular, based upon internal rules and the particular transaction type, the DDS routes transactions to the appropriate server(s). Transactions are classified according to where they may be executed. Specifically, transactions may be classified as SPECIFIC, ANY or ALL. A SPECIFIC transaction must be processed at one or more specific servers irrespective of the accompanying arguments. An ANY transaction may be processed at any of the servers and selection is made psuedorandomly. An ALL transaction requires processing by each of the data servers.

BRIEF DESCRIPTION OF THE DRAWINGS

FIG. 5 is a diagram providing an example of records stored within the system of the present invention.

DETAILED DESCRIPTION OF THE PREFERRED EMBODIMENTS

Figure 1:
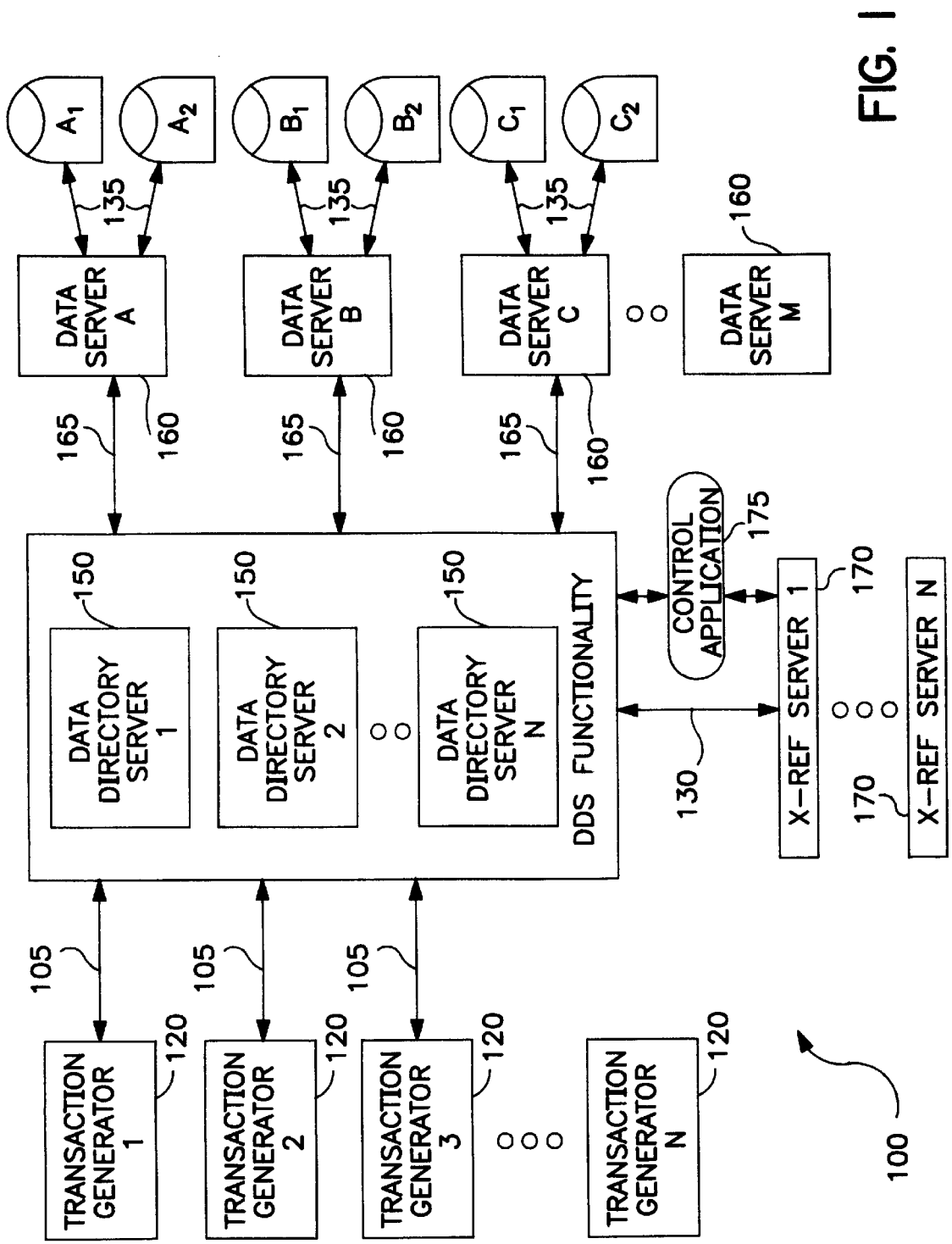
FIG. 1 is a block diagram depicting the architecture of one embodiment of the Subscriber Management System of the present invention.

FIG. 1 illustrates the system and architecture of one embodiment of the present invention. While the various aspects and embodiments of the invention are capable of use in various types of distributed database systems, for simplicity, the invention will be described in connection with a Subscriber Management System (SMS) 100 having a distributed database. Such system is useful for, among other things, cable system operations. However, the invention is not limited to this use. As shown in FIG. 1, the SMS 100 comprises a plurality of transaction generators 120 labeled 1 through N, where N=any integer. Each transaction generator 120 is connected via a two-way communication link 105 to one (or more) data directory servers (DDS) 150. The present invention may include any number of data directory servers 150, but includes at least one. Each data directory server 150 in turn is connected via a two-way communication link 165 to multiple data servers ($DS_A$–$Ds_m$) 160. Each data server 160 is in turn connected to one or more databases either as components of a single subsystem (processor and database) or through a two way communication link 135. Additionally, each DDS 150 is connected via a two-way communication link 130 to one or more cross reference servers X-ref$_1$-X-ref$_n$, where N=any integer) 170.

FIG. 1 indicates a block of 1 through N, (where N=any integer) DDSs 150 representing DDS functionality within the SMS. It is to be understood that, although not shown, connections between transaction generators 120 and DDSs 150 as well as those between data servers 160 and DDSs 150 are preferably individual connections rather than to a grouping of DDSs. For example, Transaction Generator 1 is separately connected to each of the DDSs as is Data Server A. Alternatively, however, DDS functionality may be grouped with common connections to transaction generators 120 and/or data servers 160 as indicated in FIG. 1 so long as proper control between DDSs 150 is maintained.

Additionally, the SMS system 100 includes at least one control application 175 for communication between the DDS(s) 150 and a human operator and/or another SMS process. As will be discussed in more detail below, the control application 175 provides, among other functionality, a means for updating the internal rules used by the DDS(s) 150.

As described in more detail below, when a transaction is generated by a transaction generator 120 and sent to a data directory server 150, the data directory server 150 determines the appropriate server 160 for execution of the transaction. Preferably, this is accomplished by the DDS 150 consulting the internal rules and identifying the arguments associated with the transaction, as detailed below.

The SMS 100 of the present invention is designed to manage a very large number of OLTP transactions occurring within the system. The SMS 100 of the present invention provides users with the ability to query across the entire database from any client in the system. Similarly, each of the users may update data located anywhere within the SMS 100.

Client—Transaction Generator

The transaction generators 120 in the system of the present invention may be any devices capable of receiving input from a user and transmitting that input to the Data Directory Servers (DDSs) 150. This type of device is often referred to as a client and these terms are used interchangeably herein. These devices may be dumb terminals (i.e. incapable of performing local processing) or they may have various processing capabilities of their own. Examples of transaction generators include, without limitation, PC's, RISC-based workstations and local area networks. In typical applications, there will be a large number of transaction generators 120. Thus, the SMS 100 is designed as an open platform environment which is hardware independent. The transaction generators 120 may be homogeneous in terms of interface and operation or they may be heterogeneous. In other words, all transaction generators 120 may be of one type or there may be a variety of devices interacting with the DDSs 150. It is also possible to permit customer interaction with the SMS 100 through an ARU/ANI (Automated Interactive Voice Response Unit/Automatic Number Indicator) (not shown). In this case, much of the processing may be driven by the telephone number retrieved by the ANI when the customer calls into the system.

DDS

The DDSs 150 of the present invention function as the middle tier of a three tier client/server architecture. As illustrated in FIG. 1, more than one DDS 150 may exist within the SMS 100. In such case, each of the DDSs 150 has communication access to all of the other DDSs 150 as well as to each of the data servers 160. The DDSs 150 serve three primary functions. After receiving a client request, the selected DDS 150 first locates the appropriate server 160 for execution of the request, it then submits the client request to the selected server and finally the DDS 150 returns the result to the submitting client 120.

Transaction generators 120 requesting information from the SMS databases must connect to a DDS 150 prior to accessing data. Through the use of internal rules, the DDSs 150 determine where a remote procedure should run in order to complete processing of a transaction. Access to the DDSs 150 may be efficiently implemented through the use of remote procedure calls (RPCs) which are identified in tables internal to the DDS 150. Any of a large number of standards for such RPCs may be used with the current invention.

The DDS(s) 150 are preferably open server applications that provides a mechanism to direct any data request associated with a generated transaction to a data server 160 that can service the transaction generators' requests. Specifically, the DDSs 150 may be open servers comprising the same or similar hardware as the data servers 160 of the present invention. Alternatively, the DDSs 150 may be configured differently from the data servers 160. The DDSs 150 function to analyze the client's data request transaction and, based upon the transaction type and a set of rules, directs the request to the appropriate data server 160. The types of transactions which are received at the DDSs 150 are based upon a set of stored procedures recognizable to the DDSs 150 and available to the transaction generators 120.

The DDSs 150 communicate with a plurality of data servers 160 each accessing one or more storage devices. In a preferred embodiment of this invention the data servers 160 are Sybase SQL Servers which execute Sybase remote procedure calls. This invention is not, however, necessarily limited thereto and the servers may be of any type so long as the stored procedures are designed for processing by the particular server and the associated database which are selected. It is possible to employ any number of servers 160, transaction generators 120 and DDSs 150 in the SMS 100 of this invention so long as the proper number of communication channels can be supplied and supported.

As noted above, more than one DDS 150 may exist in the system to provide scalable execution of these functions, each such DDS 150 being in communication with all transaction generators/clients 120 and all servers 160. In an embodiment with multiple DDSs 150, clients 120 are connected with one DDS 150 according to a pre-determined method.

Prior to discussing the specifics of database transactions according to the method and system of this invention, it is necessary to understand that the DDSs 150 preferably operate according to a limited number of event handlers responsible for processing the requests generated by the transaction generators 120 as well as internal requests generated as a result of DDS processing itself. The event handlers are as follows:

1. Start Handler—The start handler provides a convenient and central location for installing any other event handler routines, building any tables necessary for processing client requests and for installing any other services that the DDS requires for its functionality.

2. Stop Handler—The stop handler is executed when a request to shut down the system has been received through a particular request or as a result of certain system conditions.
3. Connect Handler—The connect handler is executed whenever a client connects to the DDS.
4. Disconnect Handler—The disconnect handler is executed whenever a client terminates an active connection to the DDS.
5. Language Handler—The language handler is executed whenever a client application issues a language statement to the DDS. The language handler in the DDS does nothing since all client requests are required to be either registered procedure calls or remote procedure calls.
6. RPC Handler—The Remote Procedure Call handler carries the bulk of the load shouldered by the DDS and is the most important handler for purposes of this discussion. Any client request which is not registered in the DDS registered procedure table will generate an RPC handler event where the request is analyzed by the RPC event handler and acted upon accordingly.
7. Error Handlers—Several error handlers are installed in the DDS application to provide information on any failure from the client, server and client/server components of the DDS. All error messages are logged in the DDS.
8. Attention Handlers—An attention handler is installed to handle disconnects from a client application. The DDS has been set up to cause all client disconnects to generate an attention event in order to determine if the client application has interrupted its connection to the DDS.

The functionality comprising the operation of the DDS can be categorized into three separate classes—the main function, the local DDS registered procedures and the utility functions. The main () function provides the entry point for all executable C programs. Note that although the preferred embodiment is formulated using the C and C++ languages, the particular invention described herein is by no means limited to such a design. The error handlers and the start handler are installed in the main function body. These include a set of routines which serve to parse input parameters and configuration file attributes in order to set up any DDS properties. The network listening function is spawned in the main function body and sleeps until the DDS application is terminated either normally or abnormally.

The DDS application is dependent on several global data tables. These global tables are used to control the navigational decisions that the RPC Handler needs to direct the client's data requests to the appropriate data server in order to complete the data request. A more detailed discussion of the global tables, including construction, maintenance and use, follows below.

The Open Server Install Registered Procedures, os_install_reg_procs (), function provides a central installation point for all registered procedures on the DDS and is grouped in the start handler classification. Service requests originating at the client that are not identified as a registered procedure, are treated as remote procedure calls and are handled by the RPC Handler. All of the event handlers and supporting system functions provide a trace log of activities in a locally maintained log file. This file is preferably truncated every time the DDS application is started.

Data Servers

The data servers 160 maintain the customer data and are accessible by each of the transaction generators 120 through a DDS 150. In a typical implementation, the data servers 160 are SQL devices which are capable of executing the RPCs transmitted by a DDS 150.

The databases making up the enterprise can be either homogenous or heterogeneous. In a homogeneous environment, particular protocols for accessing each of the databases are consistent throughout the enterprise. Conversely, in a heterogeneous environment, the particulars of database access vary within the enterprise. In a heterogeneous environment, it is often desirable, however, to render any differences in requirements within the enterprise transparent to user working at the client site. That is, a user should not be aware of any database heterogeneity and a user request should be processed in a standard manner across all resources.

The databases which are accessed in a distributed system may all be located together or they may be physically apart. They may be at the client location or they may be at an alternate site. Databases may be relational databases such as SYBASE (a trademark of Sybase, Inc.) or they may be as simple as a series of flat files.

Control Application

Returning to FIG. 1, it can be seen that the DDSs 150 interface with a control application 175. The control application 175 functions to allow a system operator to store, update and modify stored procedures available to transaction generators 120. This is typically accomplished by downloading the update to the X-Ref Server 170 which loads the new rules base into the DDSs 150 at DDS startup. This will be discussed in more detail below.

X-Ref Servers

The SMS system also includes one or more X-Ref Servers 170. As will be discussed in further detail below, the X-Ref Servers 170 function as a resource available to the DDSs 150 for determining where specific data resides in the system and for storing the rules base which is loaded into the DDSs 150 at DDS start-up. The X-Ref Servers 170 contain a variety of global tables which are continually updated as data is added, updated and deleted within the system.

Figure 2A:
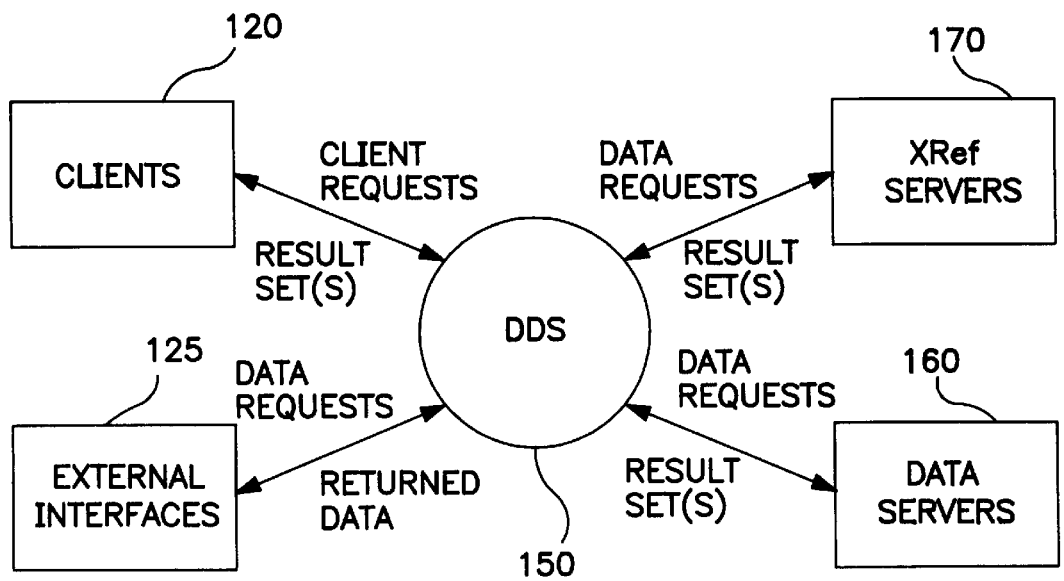
FIG. 2(a) is a context diagram indicating the general dataflow in the Subscriber Management System of the present invention.
Figure 2B:
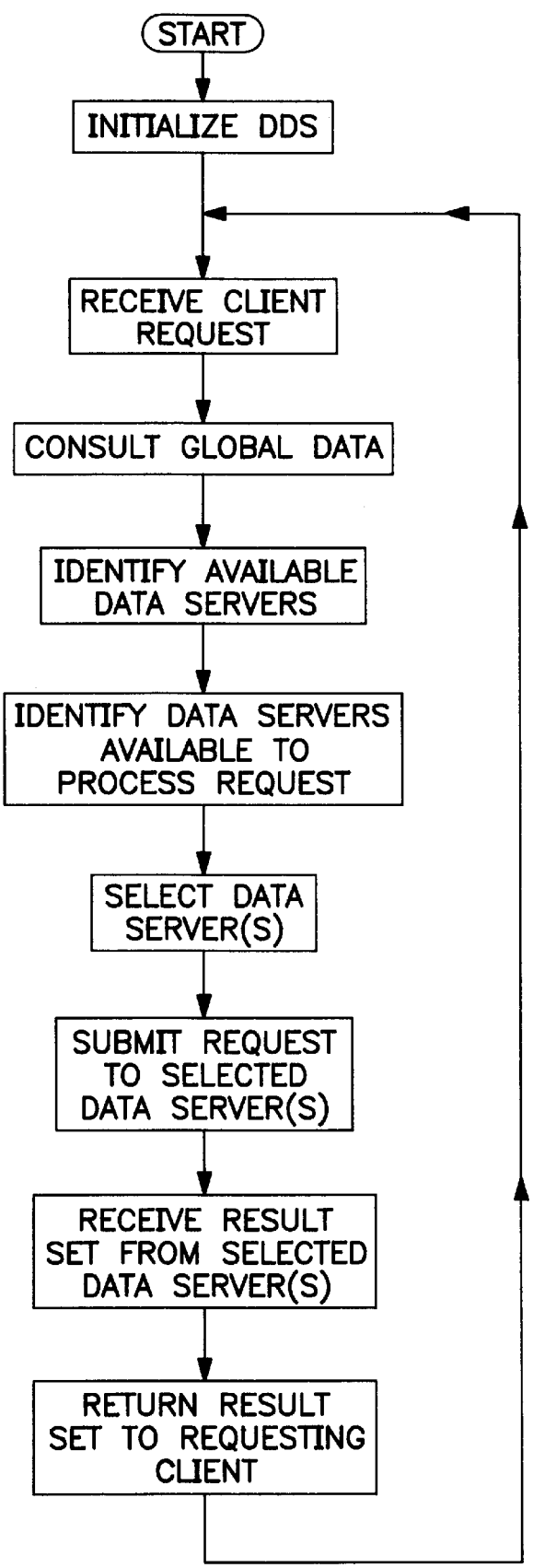
FIG. 2(b) is a flow chart illustrating, in a broad sense, the processing of a client request in the system of the present invention.

Turning now to FIG. 2(a) and 2(b), a context diagram and flow chart, respectively for the SMS system 100 as controlled and regulated by the DDS function 150 are provided. In a preferred embodiment, the DDSs 150 access the XRef Server(s) 170 at startup to access database information necessary for the operation of the DDSs 150. After the start-up tasks are complete, normal client requests may be processed by the DDSs 150. Alternatively, the DDSs 150 may access the XRef Server(s) 170 (or any other device containing the required data) as requests are submitted to the DDSs 150.

Client requests are initiated at the transaction generators 120 and transmitted to a DDS 150. Once it has received the data request, the DDS application consults the DDS Server Table (a global table) which identifies all of the available and accessible data servers 160. There is also provided an XRef Server Table (global) which identifies all known and accessible XRef Servers 170. An additional global table is the Error Message Handler Table which maintains all error handler messages. All of the global tables defined in the DDS 150 provide feature functionality to support the access related to these tables.

FIG. 2(a) also shows the various transaction generators 120 connected to the DDS 150. Transaction generators 120 make requests for reads, writes and updates through the DDS 150. As discussed above, once a request is received, the DDS 150 determines the set of potential data servers which may execute the request and psuedorandomly selects one or more servers from that set for servicing. Alternatively, various, non-random and semi-random methods for selecting the subset of potential data servers may be used. Examples of such methods include those relating to current server loads (load balancing) and those relating to queuing theory in general. The subset of servers which are available to process the request may be determined in one of two ways as discussed above. In a first embodiment, global tables are loaded from the XRef Server 170 into internal DDS memory at DDS startup. In a second embodiment, no such loading occurs at startup—rather, upon receiving a client request, the DDS 150 submits a request to the XRef Server 170 in order to retrieve the necessary data. In either embodiment, the DDS 150 has available to it the necessary rules base and other data which is required to determine the type of transaction (including the data required and the locations of that data) and to select the appropriate data server(s) 160 for processing the transaction. Next, the request is submitted to the selected data server(s) which process the request and returns a result set to the DDS 150 which may then perform additional operation(s) on the data prior to passing the final result set back to the client 120. Alternatively, the result set may pass through the DDS 150 to the client 120 without any additional processing on the part of the DDS 150. The latter situation is generally termed "pass-through mode".

After a request has been serviced and the result set has been returned to the client 120, the DDS 150 may receive another request and process it in accordance with the above procedure. In such an embodiment, the DDS 150 does not begin processing a new request until it has completed processing of the prior request. In another and preferred embodiment, a single DDS 150 processes multiple client requests concurrently exploiting the availability of numerous resources for processing large numbers of transactions.

Additionally, provision is made for the DDS 150, and ultimately the SMS 100, to interface with external components and processes 125. Further discussion regarding these capabilities is included below.

As mentioned above, the DDS application 150 maintains several global tables which are constructed and supported by classes. These classes are next discussed.

The first class to be discussed is the Server Table Class. The Server Table Class is a global class. This class references all available servers in the SMS system 100. The Server Table class supports two tables that are constructed from DDS data files. The first table, the DDS Server Table, identifies all available data servers that are accessible by the DDS application 150. The second table supported by the Server Table Class is the XRef Server Table, which refers to all available XRef Servers. Both of the Server Tables provide server names, logins and password information to the DDS 150 so that it may access any server 160 within the SMS system 100.

The Server Table class employs information structure pointers to support the list of available servers specified by the class instantiation. The class provides methods to randomly retrieve the next available server in the table or to select a specific server in the table. In addition, it is possible to retrieve the user ID and password associated with a server as well as the number of servers available.

The XRef Server Table is built on the instantiation of the Server Table Object through the applicable DDS data file. The Server Tables are built based on the server names and in the preferred embodiment the initial ordering is alphabetical by server name. It is of course possible to implement other ordering schemes for building the XRef Server Table.

The DDS Server Table is a global table which is also constructed from the DDS data file. The Server Table Class definition of the preferred embodiment is given below:

```
class ServerTbl
{
private:
    SrvInfo        *_server;              //server information
                                            structure
    CS_INT         _next;                 //next server name
    CS_INT         _serverCnt;            //server count
protected:
                   ServerTbl();
public:
                   ServerTbl(CS_CHAR*,
                   constCS_CHAR*);
                   ~ServerTbl();
    CS_CHAR        *GetNext();
    CS_CHAR        *GetUID();             //inline
    CS_CHAR        *GetPswd();            //inline
    CS_INT         GetCnt();              //inline
    CS_CHAR        *GetSpecific(CS_INT i); //inline
    CS_VOID        UpdateTbl(CS_CHAR*,
                   const CS_CHAR*);
}
```

As can be seen, this definition identifies the server information structure, the next available server and the number of servers of a specified type. It is to be understood that the class definition illustrated above is given by way of example only and is by no means the only possible class definition which may be employed in the present invention.

The ServerTbl class definition includes the _server information structure pointer which supports a list of available servers specified by the class instantiation and contains the server name, a user ID and a password. The user ID and password are available for use with any system administration functionality that supports the DDS server. The _next data member is an integer value that contains the next element of the _server list (the next available server). It is possible to access this information through a calling routine discussed below. Finally, the _serverCnt element is included. This member is an integer value containing the number of servers available to the calling routine.

The Server Table class definition of the preferred embodiment also contains various member functions. The class constructor ServerTbl (CS_CHAR *, const CS_CHAR *) takes as arguments the type of server (XRef or DDS) and the server data table name. When called, this constructor initializes the member data and calls the UpdateTbl function with the same arguments. As a result, the server table can be initialized and built.

The UpdateTbl function performs all of the DDS data file management to obtain the required information concerning a specified server. In addition, this function serves to build the Server Table. The GetNext function returns the next available server in the instantiated table. This function provides a level of randomization to evenly distribute server request loads. The GetUID function returns the current user ID for the specified server. The GetPswd function returns the current user password for the specified server. The GetCnt function returns the current number of servers of the instantiated type. Finally, the GetSpecific function returns a specifically requested server table entry.

The next class to be discussed is the Server Name class. Again, various functions are associated with this class, in this case to allow the DDS to select a stored procedure. The server name is represented by this class definition which identifies the current server table element and the procedure element requesting the server name. The Server Name class definition of the preferred embodiment is provided below:

```
class SrvName
{
private:
    ProcElem    *_p;
    CS_INT      _argVal;
    CS_INT      _curElem;
public:
                SrvName(ProcElem*,CS_VOID**);
                ~SrvName();
    SrvElem     *GetNext(SrvElem*&);
    SrvName&    operator=(const SrvName&);
    CS_INT      GetSrvCnt();
    CS_INT      GetSrvTyp();
};
```

The Server Name class identifies the current server table element that supports the current stored procedure in the procedure list. In addition, this class provides data elements that point to the current stored procedure in the procedure list table. Finally, the class stores parameters associated with the current stored procedure and a current element flag.

The _p data member is a pointer to the procedure list table stored in the DDS. The _argVal data member contains an integer value that identifies the argument position for any rule based stored procedure. The _curElem member is an integer which represents the currently selected procedure from the procedure list.

The GetNext() member function applies the rules for retrieving the appropriate server name. As will be discussed below, this is necessary when the DDS must process an "ALL" or an "ANY" request. The GetSrvCnt() simple returns the number of servers associated with the current stored procedure. The GetSrvTyp() returns the distributed transaction processing (DTP) code back to the requester. As will be discussed below, the DTP code refers to a particular processing paradigms including ANY, ALL and SPECIFIC.

The class constructor and destructor functions allocate memory and construct the server table and deallocate and release the table respectively. An additional function provides a mechanism to return the name of the next server in the list. The member functions for the Server Name class are illustrated in Table 1.

TABLE 1

SERVER NAME CLASS FUNCTIONS

```
* SrvName :: SrvName(ProcElem *_p, void **argList)
    Assign procedure element _p to SrvName class variable.
    If the argList a is not NULL
        Assign the argument position value to the class variable
    initialize the current element class variable to 1
* SrvName :: GetNext( )
    if (-P-> firstSrv) // GROUP
        if((_p->dtpCode ==ALL)&&
            (_curElem<=_p>elemCnt))
                curSrv = _p->firstSrv[_curElem - 1]
                ++_curElem
        else if ((_p ->dtpCode == ANY) && (_curElem == 1))
            rNum = _p->firstSrv[GetRandom( )]
            ++_curElem
        else if ((_p ->dtpCode == SPECIFIC) &&
            (_curElem == 1))
                curSrv = _p->firstSrv[_curElem - 1]
                ++_curElem
        else
            retrieval is complet, return a NULL pointer value
            reset _curElem to 1
```

TABLE 1-continued

SERVER NAME CLASS FUNCTIONS

```
        else if(_p -> firstRule)
            for i = 0; i < _p->firstCnt; i++
                if _argVal == NULL
                    set curSrv to NULL
                    the parameter for this stored procedure
                    is missing
                if _argVal <= _p -> firstRule[i] -> high_val &&
                    _argVal >= _p -> firstRule[i] -> lowVal &&
                    _curElem == 1
                        curSrv = _p->firstSrv[i].servers
                        curSrv -> dbName = _p->dbName
                        increment _curElem
                        break out of for loop
                else if _curElem > 1
                    set curSrv to NULL
                    reset _curElem to 1
                    break out of for loop
                else
                    continue
            end for loop
        else
            set curSrv to NULL
            there is a problem with the XRef Data Tables
    return curSrv;
* SrvName :: GetSrvCnt( )
return _p->firstCnt
*SrvName :: GetSrvTyp( )
return _p->dtp_code
```

The next group of classes to be discussed relate to the XRef Data tables. The XRef Data tables consist of database information that supports the decision making requirements to access the various data servers supporting the SMS application. Four tables located within the XRef Server contain information related to:

o all of the stored procedures available for a client to submit to the DDS;

o all of the data servers accessible by the DDS;

o the various server groups that the data servers fall into; and o the rule boundary information that binds the rule based stored procedures to the data server(s) that can support the client request.

This information is retrieved from the XRef Server by the DDS application at startup. The data is stored in three tables internally within the DDS. The three internal tables are:

1) Procedure table—which consists of all stored procedures;
2) Server table—which consists of all data server data; and
3) Rule table—which consists of all decision rule data The data structures for these tables are constructed by stored procedures that return results in a format consistent with DDS internal storage format. Each of these tables is supported through the XRef class definition and is given below:

```
struct SrvElem
{
    char        SrvName[MAXNAME];
    char        warmSrv[MAXNAME];
    char        grpName[MAXNAME];
    int         srvConn;
    int         warmConn;
};
struct RuleElem
{
    char        ruleName[MAXNAME];
    int         lowVal;
    int         highVal;
    char        srvName[MAXNAME];
```

-continued

```
        SrvElem         *servers
};
struct ProcElem
{
        char            procName[MAXNAME];
        char            grpName[MAXNAME];
        char            ruleName[MAXNAME];
        char            srvName[MAXNAME];
        char            dbName[MAXNAME];
        PROC_TYPE       pType;
        DTP_CODE        dtp;
        int             argPos;
        int             firstCnt;
        SrvElem         *firstSrv;
        RuleElem        *firstRule;
};
```

The XRef Data tables are represented by a class that defines data structures for the stored procedure list, the server list and the rules list. A count is also maintained for each of the lists. The XRef Data table class of the preferred embodiment is given next:

```
class XRefDataTbl
{
private:
        ProcElem        *_procList;
        SrvElem         *_srvList;
        RuleElem        *_ruleList;
        CS_INT          _procCnt;
        CS_INT          _srvCnt;
        CS_INT          _ruleCnt;
protected:
        XRefDataTbl();
public:
        XRefDataTbl();
        ~XRefDataTbl();
        CS_INT          GetProcCnt();      //inline
        CS_INT          GetSrvCnt();       //inline
        ProcElement     *GetProcList();    //inline
        CS_RETCODE      GetServer(CS_CHAR*,CS_VOID**,
                        SrvName*);
        CS_RETCODE      UpdateTbl(CS_CHAR*,CS_CHAR*,
                        CS_CHAR*);
        CS_RETCODE      RunRpc(CS_CONNECTION*,CS_CHAR*,
                        CS_INT);
        CS_RETCODE      BldList();
};
```

The _procList member data is a pointer to the list of stored procedures stored in the XRef data tables within the DDS. The _srvList member data is a pointer to the list of data servers stored in the XRef data tables within the DDS. The _ruleList member data is a pointer to the list of rules stored in the XRef data tables The _procCnt member data is an integer value containing the number of stored procedures stored in the _procList. The _SrvCnt member data is an integer value containing the number of data servers stored in the _srvList. Finally, the _rulecnt member is an integer value containing the number of rules stored in the _ruleList.

The member functions include a class constructor and destructor for creating and releasing the lists. Further the GetServer() member function retrieves a server name based on the procedure name and its arguments.

As mentioned above, the XRef data tables are constructed through the class instantiation and are linked together based on the procedure names and its type. The XRef Data Table constructor function calls the table update member function that initialized the table element counts. It also calls the update function to build the tables. The GetrocCnt(), GetSrvCnt() and GetProcList() member functions are inline functions that return the number of stored procedures in the procedure list, the number of servers in the server list, and a pointer to the procedure list respectively. Table 2 illustrates the member functions associated with the XRef Data Table class in the preferred embodiment.

TABLE 2

XREF DATA TABLE CLASS FUNCTIONS

The object constructor is as follows:
    XRefDataTbl::XRefDatatbl( )
        initialize the procedure, server, and rule counts to zero
        if(UpdateTbl(CS_CHAR *server, CS-CHAR *uid,
        CS_CHAR *pswd)!= CS _ SUCCEED)
            exit out of the function
The UpdateTbl function represents the XRef data table update
function that builds the XRef data tables from the XRef Server.
    XRefDataTbl::UpdateTbl(CS-CHAR *server, CS._CHAR *uid,
    CS-CHAR *pswd);
    {
    Set up the client interface to the XRef Server
        This is a standard client library interface set up
    Run the stored procedure "lp_get_srv_cnt" to retrieve the
        number of servers stored in the database.
        if it fails, there is a problem with the XRef Table Data
    Run the stored procedure "lp_get_rule_cnt" to retrieve the
        number of rules stored in the database.
        if it fails, there is a problem with the XRef Table Data
    Run the stored procedure "lp_get_proc_cnt" to retrieve the
        number of procedures stored in the database.
        if it fails, there is a problem with the XRef Table Data
    Allocate sufficient memory to store the number of rows for
    the server list.
    Run the stored procedure "lp_get_srv_list"
    to retrieve the data from
        the SERVER_GROUP and SERVER tables.
    Allocate sufficient memory to store the number of rows for
    the rule list.
    Run the stored procedure "lp_get_rule_list"
    to retrieve the data from the
RULE-BOUNDARY and SERVER tables.
    Allocate sufficient memory to store the number of rows for
    the procedure list.
        Run the stored procedure "lp_get_proc_list"
        to retrieve the data from
    the PROCEDURE table.
        Integrate the lists by calling the BldList( ) function
        Exit and clean up the client application
    };
The Build List function builds the lists such that the three XRef data
tables are interlinked to provide a quick access to the desired server
name based on the stored procedure issued by the user.
    XRefDataTbl::BldList( )
        For every row returned from "lp-get_proc_cnt"
        link the structure
            if procList->pType == GROUP
            sequentially search srvList for srvList->
                grpName == procList->grpName
            store first srvList element in procList->firstSrv
            assign procList->firstRule = NULL
            initialize first count to zero
            sequentially search srvList and count the number of
                servers supporting the server group
            store the count of the number of server in
                procList->firstCnt
        else if procList->pType == RULE
            sequentially search ruleList for
                srvList->ruleName==procList->ruleName
            store first ruleList element in procList->firstRule
            assign procList->firstSrv = NULL
            sequentially search ruleList and count the number of
                rules supporting the server group
            store the count of the number of rules in
                procList->firstCnt
            sequentially search server List for server name
                assign server pointer to server list element
        else // procList->pType == SPECIFIC
            sequentially search server list for server name
                assign firstSrv to the server list element
                assign NULL to firstRule
                assign 1 to firstCnt
                break out of for loop
```

TABLE 2-continued

XREF DATA TABLE CLASS FUNCTIONS

```
};
The Run RPC function issues the command to the remote data
server and processes the results.
    XRefDataTbl::RunRpc(CS-CONNECTION *conptr,
    CS_CHAR *cmd, CS_INT cmdType)
{
    Allocate the command structure
        Initiate the command
        Send the command
        Process the results based on the command type
            This functionality is specific to the type of command issued
        Drop the command structure
}
The get server function searches the stored procedure list for a
particular stored procedure and creates a server name class object
to point to the first server supporting that stored procedure.
CS_RETCODE
    XRefDataTbl::GetServer(char *procname, void **argList,
    SrvName *server)
{
    Perform a binary search of the procedure list for the
    current stored procedure if it fails to get an entry,
        return CS – FAIL;
    Create server name object server for the procName and argList
    Assign server name to return parameter
    Return CS_SUCCEED;
}
```

The DDS requires the Xref Data Table and Server Table information to operate in the SMS environment. The tables are used to locate the appropriate data server(s) to satisfy a client's stored procedure request. Additional stored procedures will continuously be added to the client's application to facilitate new and enhanced features in the SMS environment. These new stored procedures must be included in the Xref server data table to complete the implementation of the features which, in turn, requires a reload for the DDS internal tables. Also, additional data servers and DDS's may be added to the SMS. New servers must be added to the DDS data table as well as to the Xref server data table so as to include these servers in the DDS internal tables.

The next class to be discussed is the ClntUsrData class. The ClntUsrData class is used as a means of encapsulating information needed by a client service thread in the DDS open server application. This class is constructed in the connection handler and is pointed to by the user data for the client's internal client thread control structure. The data is encapsulated within self-describing data objects including both the data itself and the type or format of the representation of the information. In this way it is unnecessary to access the related class descriptors or class definitions to retrieve the required semantic information. Through encapsulation, the data can be retrieved easily within any of the handlers that a client thread may enter. The ClntUsrData class of the preferred embodiment is:

```
class ClntUserData
{
private:
    FMT_CTL*                _fmtCTL;
    Ucon*                   _ucon;
public:
    ClntUsrData(int         numSrvs,
                            LoginData & loginData,
                            CmdConPool*cmdConPoolPtr);
    ~ClntUsrData();
    virtual Ucon*           GetUcon();      //inline
    virtual FMT_CTL         *GetFmtCtl();   //inline
}
```

The ClntUsrData class provides a repository for information related to a client's user data which is stored and reused with the client's thread properties. This class encapsulates format control information needed to process result sets in the "ALL" scenario (discussed below) and user connection objects that allow a client to re-use remote server connections. There exists one ClntUsr Data class allocation for each client accessing the DDS.

The _fmtCtl member data variable contains encapsulated information needed by several functions when processing results for an "ALL" scenario in the DDS application. The _ucon member data variable is a user connection object that allows a DDS client to re-use its remote server connections, saving the overhead of continually re-opening connections. It is an object that abstracts and organizes client connections.

The ClntUsrData() only constructor uses its arguments to allocate the _ucon object. It also allocates and initializes a FMT_CTL structure. The ~ClntUsrData() destructor de-allocates _ucon and _fmtCtl which were allocated by the constructor. The GetFmtCtl() inline member function returns the private _fmtCtl data member and the GetUcon() inline member returns the private _ucon data member.

The TopRPCList class ranks the most used RPC's, calculating each RPC's average execution time and returning the name, number of executions, and the average execution time to the requesting client. This class is called from the rp_mon_rpc registered procedure and is invoked when the DDS Control Application submits a monitoring request. All of the processing for this class is invoked from the constructor; no other member functions need be called by the user. The inherited TopList member functions do most of the underlying ordering work. The TopRPCList class of the preferred embodiment is:

```
class TopRPCList: public TopList
{
protected:
    virtual COMPARE_CD CompareFunc(void *)
public:
            TopRPCList(SRV_PROC*srvProcPtr,
                ProcElement* rpcListPtr,
                CS_INT rpcListSize,
                CS_INT topListSize);
            ~TopRPCList() {}
};
```

The protected virtual function CompareFunc(void * item) provides a complete definition for the pure virtual function declared by TopList. This function compares the item >cumNumRuns against the _current->cumNumRuns and returns a COMPARE_CD.

The TopRPCList (SRV_PROC * srvProcPtr, ProcElement * rpcListPtr, CS_INT rpcListSize, CS_INT topListSize) constructor builds a list of topListSize ranked by the frequency of executions of RPC's in the array pointed to by rpcListPtr. The RPC list is of size rpcListSize. The RPC list and its size are defined in the XrefDataTbl class for the DDS. Once the list is loaded, this member function walks through the list, returning results to the requesting client. Each row contains the rpc_name, the number of executions, and the average execution time for the RPC. The average execution time is calculated by dividing the cumSeconds by the cumNumRuns as stored in the ProcElement in the XRefDataTbl.

RPC Handler

The DDS of the present invention processes a great majority of client requests through the RPC Handler which is now discussed. The DDS accepts client stored procedure requests and first investigates the resident registered procedure list table to locate the RPC in question. If the RPC is found in the table, the procedure is executed locally. If the RPC is not found in the table, the DDS raises a RPC Handler event and relinquishes control to the handler routine.

The RPC Handler processes all client stored procedure requests to determine which of the data servers should service the request. The RPC Handler provides a semi-passthru capability for client requests that require selection of specific data servers that can support the client's request. This results in a single result set from the specified data server. The RPC Handler also supports stored procedure requests from client applications that access several data servers at a time in the same group. This allows for multiple result sets being passed back to the requesting client.

Figure 3:
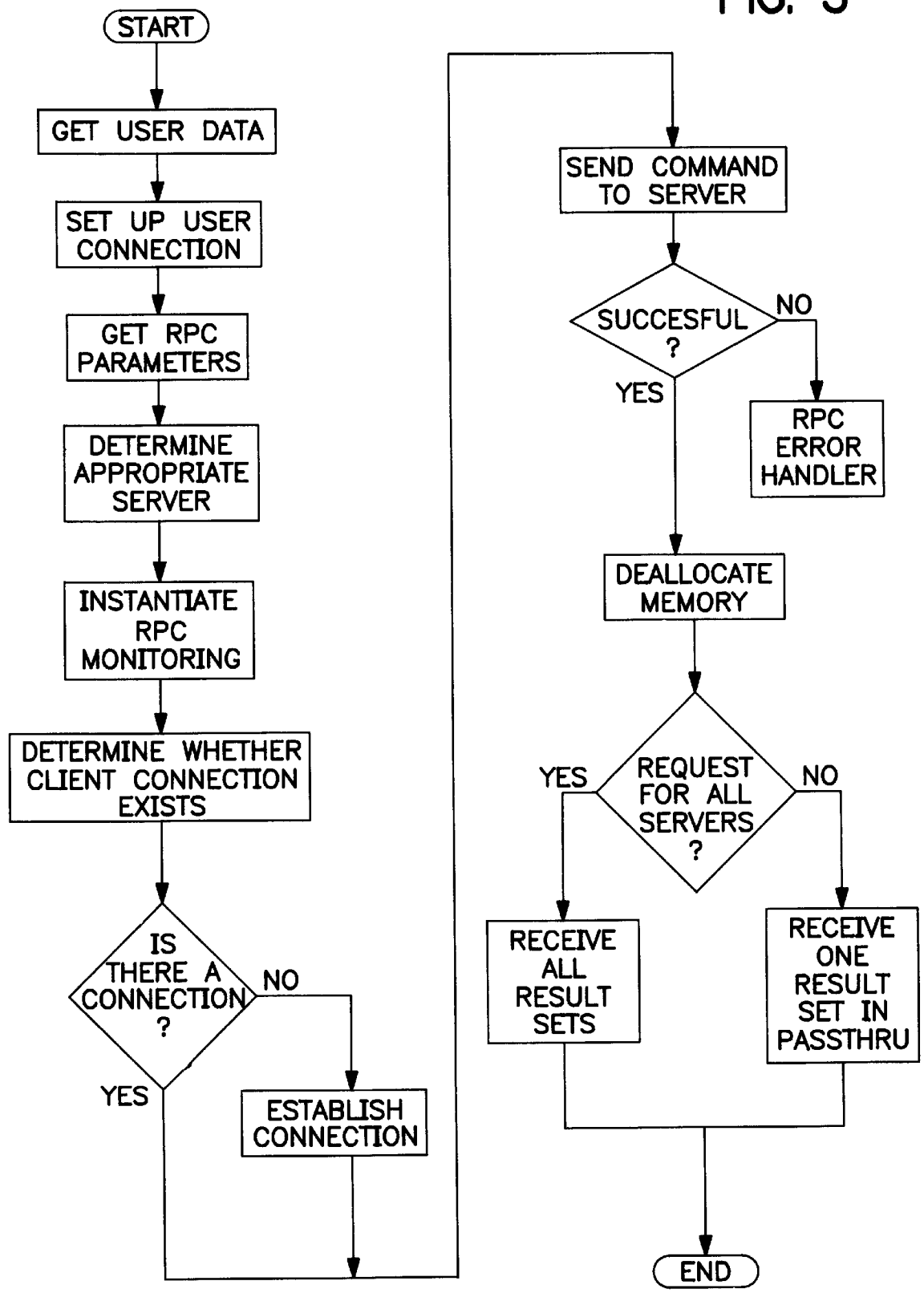
FIG. 3 is a flowchart illustrating the RPC Handler Process in a preferred embodiment of the present invention.

In semi-passthru mode, the system parses the incoming client RPC command request and the RPC command result set is passed thru the intermediate DDS directly to the client. The incoming client command requests are parsed to identify the request and any parameters associated with the command. The command request and its parameters are used to identify the appropriate data server to best service the request. The process flow for the RPC Handler process is illustrated in FIG. 3 and is now discussed.

Initially and upon a request for service from a client, the user data (including username, password, etc.) regarding such client is obtained. The DDS can use this information to set up a User Connection Object.

The RPC command name is then retrieved from the data stream as are the number of RPC parameters associated with the RPC command, and the RPC parameters if they exist. The RPC Handler then causes the appropriate Server name (s) for the remote procedure call to be determined. This is generally accomplished by getting the next server element. At this point, in a preferred embodiment of the instant invention, the RPC Monitoring functionality is instantiated so that the control with respect to request servicing may be optimized.

The DDS then determines if a connection to the selected server(s) exists. If so, then the request is submitted to that server. If no connection exists, then one is set up.

If the request was an "ALL" request (i.e. a read from or write to all data servers in the SMS system) then the result sets from all data servers are received by the DDS as part of the RPC Handler process flow. Otherwise, for requests directed to single or a group of data servers, the result sets are returned to the requesting client in passthru mode through the DDS.

ALL, ANY, SPECIFIC

Figure 4A:
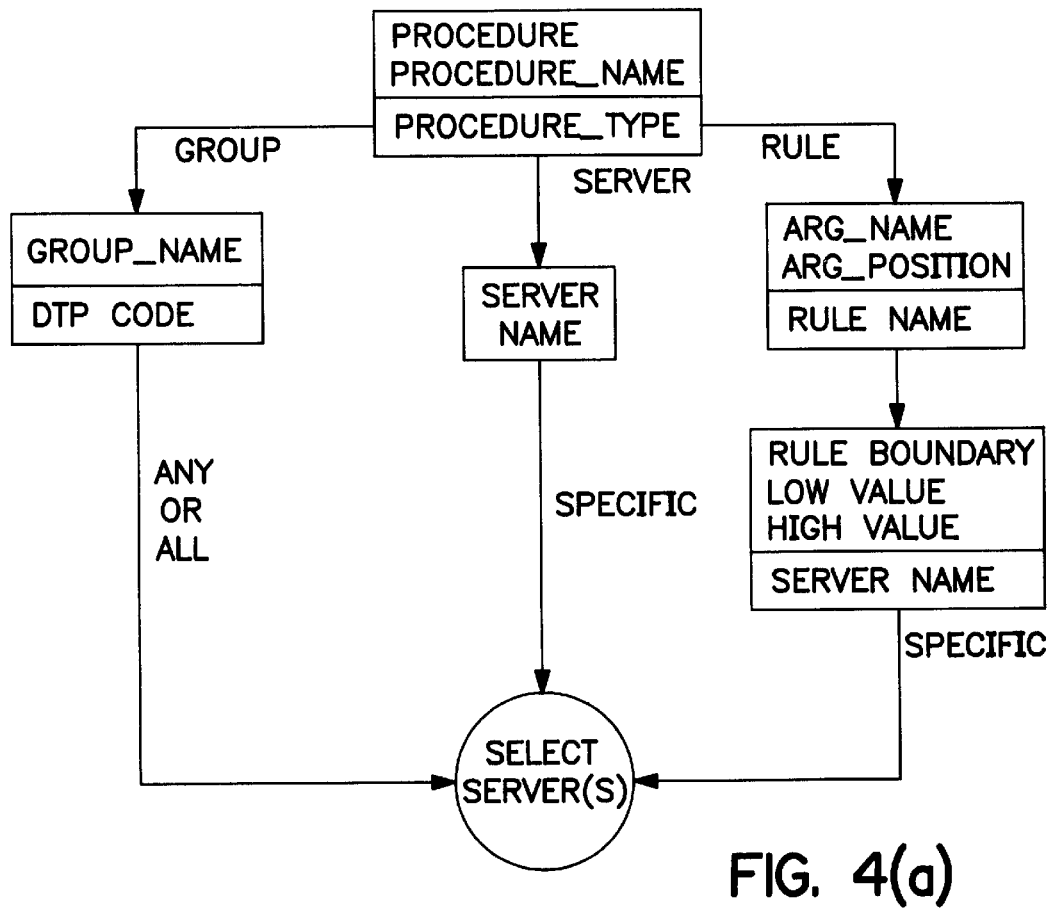
FIG. 4(a) is a data flow diagram illustrating the server selection process.

The present invention acts on various scenarios for efficiently allocating requests to data servers based upon the type of transaction involved. This aspect of the invention will now be discussed in detail with reference to FIGS. 4(a) and 4(b). FIG. 4(a) is a data flow diagram illustrating the data and decision making process in selecting a server based upon an "ALL", "ANY" or "SPECIFIC" data request. As will be discussed in further detail below, a "SPECIFIC" request corresponds to a Procedure Type=Server and an "ANY" or "ALL" request corresponds to a Procedure Type= Group.

Figure 4B:
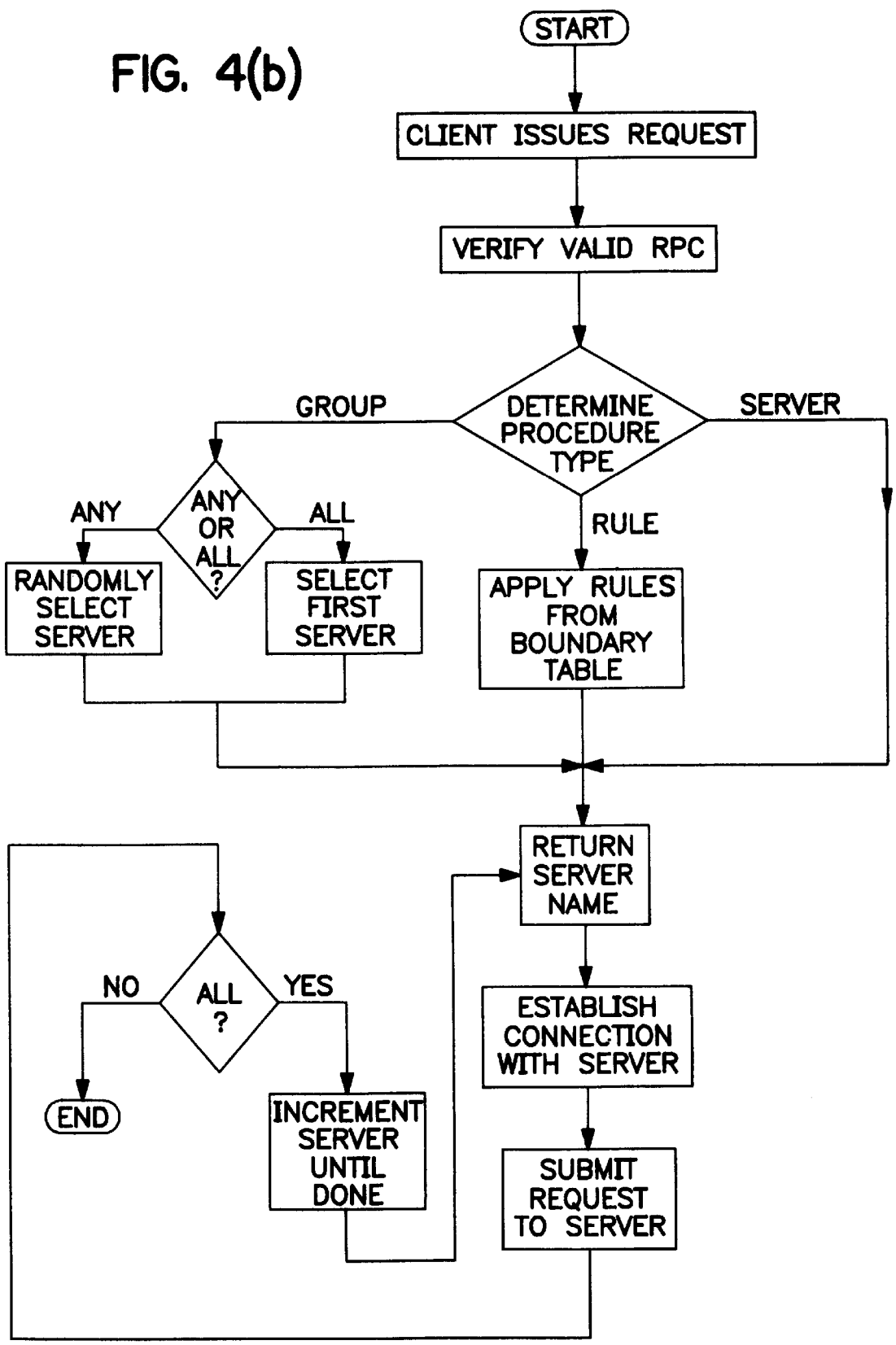
FIG. 4(b) illustrates the steps in a preferred embodiment of the "ALL" processing scenario.

The "ANY" scenario will be discussed in detail now. It is to be understood that some or all of the steps next discussed may be omitted and additional steps may be added while still remaining within the spirit of the invention. FIG. 4(b) illustrates the important steps in the process while the ensuing discussion elaborates on the steps and adds additional, optional steps.

Initially the client will issue an RPC request to the DDS. At this point the DDS will raise an RPC event which is handled by the RPC Handler functionality of the DDS. Next, the RPC counter is incremented to indicate that an active RPC is present in the DDS. At this point the user data corresponding to the client thread properties is obtained and the user connection information is set up.

Once the preliminary setup is accomplished, the RPC command and its arguments are retrieved from the client request data stream. The DDS then obtains the appropriate data server information based upon the RPC command issued by the client. If desired, the procedure list information is obtained from the data server information and is used to instantiate the RPC Monitor object to start the timing of the current RPC. The GetNext function then gets the next data server in the available server list based on the procedure type and, if applicable, its argument list. In the "ANY" scenario, the DTP code would indicate that the client's stored procedure could be sent to ANY data server in the server list supporting the server group. The DDS randomly selects a data server name from the server list. Additionally, an automatic retry mechanism may be included so that the DDS selects another server from the list of available servers in the event the DDS is unable to connect to the first server selection.

Next, the GetCmdCon function is called to get or make a connection to the selected data server. The SendRpcCmd function then sends the RPC command and its argument set, if any, to the data server. After processing by the selected data server(s), a result set is returned to the DDS. The GetSrvTyp function is then invoked and returns the DTP code back to the RPC Handler. The "ANY" scenario utilizes the pass through capabilities of the DDS Open Server to process the result set. Thus the data stream returned from the data server can be sent back to the requesting client without disturbance. This is accomplished once the active command/ connection object is obtained.

Once the result set is returned to the client, the DDS issues a send done final to the client indicating that the data transfer is complete. The EndRPC function is then invoked to stop the timing of the current RPC. Next the data server object is released and the active RPC count is decremented.

The "SPECIFIC" scenario, which is used to select a single, individual server follows the same process as described above with respect to the "ANY" scenario except that the "SPECIFIC" scenario specifies rule based procedures or specific server procedures. The rule based procedure scenario selects the appropriate data server based on the data distribution rules and boundaries while the specific server procedure scenario uses the server name associated with the stored procedure.

The "ALL" scenario, which calls for a query or update to all data servers supporting the group, is processed as follows. Again it should be understood that some or all of the steps next discussed may be omitted and additional steps may be added while still remaining within the spirit of the invention. FIG. 4(b) illustrates the important steps in the "ALL" scenario processing while the ensuing discussion elaborates on the steps and adds additional, optional steps. Initially the client will issue an RPC request to the DDS. At this point the DDS will raise an RPC event which is handled by the RPC Handler functionality of the DDS. Next, the RPC counter is incremented to indicate that an active RPC is present in the DDS. At this point the user data corresponding to the client thread properties is obtained and the user connection information is set up.

Once the preliminary setup is accomplished, the RPC command and its arguments are retrieved from the client request data stream. The DDS then obtains the appropriate data server information based upon the RPC command issued by the client. If desired, the procedure list information is obtained from the data server information and is used to instantiate the RPC Monitor object to start the timing of the current RPC. The GetNext function then gets the next data server in the available server list based on the procedure type and, if applicable, its argument list. In the "ALL" scenario, the DTP code would indicate that the client's stored procedure must be sent to ALL data servers in the server list supporting the server group. The GetNext, GetCmdCon and SendRpcCmd functions are iteratively called until the server list has been completely traversed.

The GetCmdCon function is called to get or make a connection to the selected data server. The SendRpcCmd function then sends the RPC command and its argument set, if any, to the data server. For every RPC command sent to the data servers, the SendRpcCmd function establishes an Open Client environment that sends the RPC message to the SQL servers. Result sets are returned from the data servers in a random order back to the Open Client environment in the RPC Handler. The RPC Open Client sends the result sets back to the DDS. The GetSrvTyp function is then invoked and returns the DTP code back to the RPC Handler and processes multiple result sets in this scenario. The active command/connection object is obtained and while there are active commands outstanding, the result sets are retrieved and sent to the client. The RPC Handler then sends a send done MORE indication to the DDS, sets the command/connection to inactive and sends the MORE indication to the client. The MORE indicator informs the client to wait for additional result sets. As result sets are sent to the client the connections are marked inactive to indicate that the result set was retrieved from the data server.

Once all of the result sets are returned to the DDS, the DDS issues a send done final to the data server and ultimately to the client indicating that the data transfer is complete. The EndRPC function is then invoked to stop the timing of the current RPC. Next the data server object is released and the active RPC count is decremented.

Utility Functions

A set of utility functions have been developed to support the operations of the DDS. These functions are now described.

Command Connection Pool Service

The CmdConPoolSrvc object provides a mechanism to close all connections that have met or exceeded a time out limit. The time out limit is the period of time this process sleeps which is a DDS Open Server configurable time threshold.

The CmdConPoolSrvc object does not have any input parameters.

The CmdConPoolSrvc object provides output information to the DDS Error Handler which is directed to standard error and/or the DDS log file.

The CmdConPoolSrvc object returns CS_SUCCEED or CS_FAIL.

Free Parameter Memory

The FreeParamMem object frees any allocated memory associated with the Remote Procedure Call parameters passed by the client application. This object first cheeks if any parameters exist and frees all the allocated memory.

The FreeParamMem object accepts the following input parameters:
 paramCnt—An integer count of the number of parameters associated with the RPC Name.
 fmtptr—A pointer to a data format structure that will contain the format of the data received from the client in the RPC Handler.
 paramDataPtr—A pointer to an array of pointers that will contain the actual RPC command parameter values.
 paramLenPtr—An integer pointer that contains the length of each of the parameter values.
 indPtr—A small integer pointer that is require to hold the null indicator for each parameter supplied by the client process and is required to bind the local variables.

The FreeParamMem object does not output any information to standard output.

The FreeParamMem object does not return any values to the calling object.

Get RPC Command

The Get RPC command object is used in the RPC Handler and obtains the name of the client supplied Remote Procedure Call and the associated parameters, if any. If parameters exist, this object allocates memory for the local variables, binds the parameter to the local variables, and transfers the data from the TDS to the local variables.

The GetRpcCmd object accepts the following parameters:
 srvProcPtr—Service thread pointer for the current client thread.
 rpcNamePtr—A character string that points to the client supplied stored procedure name.
 paramCnt—An integer count of the number of parameters associated with the RPC Name.
 frntptr—A pointer to a data format structure that will contain the format of the data received from the client in the RPC Handler.
 paramDataPtr—A pointer to an array of pointers that will contain the actual RPC command parameter values.
 paramiLenPtr—An integer pointer that contains the length of each of the parameter values.
 indPtr—A small integer pointer that is require to hold the null indicator for each parameter supplied by the client process and is required to bind the local variables.

All the input parameters, except for the service thread pointer, are passed to the GetRpcCmd by reference.

The GetkpcCmd object does not provide any output to the standard output. All data is returned to the calling object through the input parameters which are passed by reference.

The GetRpcCmd object returns CS_SUCCEED or CS_FAIL to the calling object.

Install Registered Procedures

The InstallRegProcs object is the single point of installation of all the registered procedures stored in the DDS Open Server application. The InstallRegProcs object defines and creates all the registered procedures and any associated parameters in the Open Server registered procedure list table. In a preferred embodiment, this object installs the following registered procedures, which are presented in connection with the discussion on registered procedures.
 OsShutdown
 SetFilter
 SetLogFlag MonLog MonRpc The InstallRegProcs object does not accept any input parameters.

The InstallRegProcs object does not provide any output to standard output.

The InstallRegProcs object returns CS_SUCCESS or CS_FAIL to the calling object.

Process Command Line Arguments

The ProcArgs object processes the DDS command line arguments whenever the DDS is started. The command line arguments are extensive, but they allow the user to dynamically control how the DDS is configured on startup. The DDS argument list provides the ability to control at least the following parameters:

NETBUFSIZE is used to set the maximum size of the network I/O buffer to be used by the client connections. NUMREMBUF controls the window size used on server-to-server connections. It indicates the maximum number of packets that can be outstanding on a logical sub channel before an acknowledgment is required. NUMCONNECTIONS indicates the maximum number of physical network connections the Open Server application will accept.

NUMTHREADS specifies the maximum number of treads available to the DDS application. LOGFLAG is a flag that directs the error message to either standard error, the log file or both. NUMREMSITES indicates the maximum number of remote server site handlers that can be active at a given time.STACKSIZE defines the size of the stack allocated for each thread.SERVERNAME specifies the name of the DDS application.

The ProcArgs object accepts the following input parameters:

argc—An integer count of the number of arguments presented on the command line argv—An array of character string pointers that contain the actual input parameter values.

nonSybProps—An class object that is passed by reference to hold all the non Sybase Open Server properties.

The ProcArgs object provides a usage statement to standard error if an invalid argument is detected on the command line.

The ProcArgs object returns CS_SUCCEED or CS_FAIL.

Process Configuration

The ProcConfig object opens the dds_config.dat file and configures the DDS application with any of the specified properties and flags. The properties and flags are the same as the command line settable properties and flags. Also, if any command line properties and flags are specified when the DDS is started, the command line options will override any configuration file properties or flag settings. The ProcConfig object ignores any property or flag that are misspelled or missing any required argument. The ProcConfig object accepts the following input parameters:

ctxptr—A pointer to the context structure for the DDS Open Server application.

nonSybProps—A class object passed by reference to record any non Sybase Open Server properties that need to be set in the DDS Open Server application.

This object outputs error information through the DDS Error Handler functionality to standard error and/or the Open Server log file.

The ProcConfig object returns CS_SUCCEED or CS_FAIL.

Send RPC Command

The Send RPC command object sends the RPC command and its parameters to the remote data server. This object constructs a character string that contains the database name and the RPC name and issues a client command to the destination data server along with any associated RPC parameters.

The SendRpcCmd object accepts the following parameters:

cmdptr—A pointer to the command structure, that is used to send commands to a server.

rpcNamePtr—A character string that contains the client supplied RPC command name.

dbname—A character string that contains the name of the database that contains the RPC command.

paramDataPtr—A pointer to an array of pointers that will contain the actual RPC command parameter values.

fmtptr—A pointer to a data format structure that will contain the format of the data received from the client in the RPC Handler.

paramCnt—An integer count of the number of parameters associated with the RPC Name.

paramLenPtr—An integer pointer that contains the length of each of the parameter values.

indPtr—A small integer pointer that is require to hold the null indicator for each parameter supplied by the client process and is required to bind the local variables.

The SendRpcCmd object does not provide any output to the standard output.

The SendRpcCmd object returns CS_SUCCEED or CS_FAIL to the calling object.

The SendRpcCmd object constructs an error message and sends the message to the DDS Error Handler.

Server Message Callback

The ServerMsgCB object accepts the following input parameters:

ctxPtr—A pointer to the context structure for which the message occurred.

conPtr—A pointer to the connection structure for which the message occurred.

srvMsg—A pointer to the CS_SERVERMSG structure containing server message information.

The ServerMsgCB object provides an output message that is logged with the DDS Error Handler object that outputs the message to standard error and/or the Open Server log file.

The ServerMsgCH object only returns CS_SUCCEED.

In addition to the above DDS utility functions, a set of general utility functions have been developed to support the general operations of the DDS application. These functions are now discussed.

CONNECT SERVER

The connect server object establishes a connection to the specified data server using the login user id and password parameters. This object allocates a connection pointer structure for the specified context of the DDS, sets the connection properties for user name and password, and establishes the connection to the data server.

The ConnectServer object accepts the following input parameters:

ctxPtr—A pointer to the context structure.

conPtr—The address of a pointer of a newly allocated connection structure.

sqlsrv—A character string that contains the name of the data server to be connected to.

usrId—A character string that contains the client users identification used to connect to the data server.

pswd—A character string that contains the client password used to connect to the data server.

The ConnectServer object provides no information to standard output.

The ConnectServer object returns CS_SUCCEED or CS_FAIL.

Get User Information

The GetUserInfo object accesses the thread properties and extracts the user id and password associated with the internal thread control structure.

The GetUserInfo object accepts the following input parameters:

srvProcPtr—A pointer to an internal thread control structure usrId—A character string pointer that will contain the user identification from the thread properties.

pswd—A character string pointer that will contain the user's password from the thread properties.

The GetUserInfo object provides no information to standard output or the DDS Error Handler.

The GetUserInfo object returns CS_SUCCEED or CS_FAIL.

Manage Format Pointer

The ManageFmtPtr object provides the capability to set and/or retrieve a pointer to the format array in the remote server control structure.

The ManageFmtPtr object accepts the following input parameters:

srvProcPtr—A pointer to the thread control structure action—An integer value that specifies whether to get the format pointer, set the format pointer or clear and release all allocated format structures type—An integer value that indicate whether to process a regular row format pointer or a compute row format pointer.

computeId—an integer value that contains a compute identification of the format array which is returned to the calling object.

fmtCtlPtr—A pointer to the format control structure fmtPtrPtr—An address to a pointer to the data format structure.

The ManageFmtPtr provides no information to standard output or the DDS Error Handler.

The ManageFmtPtr returns CS_SUCCEED.

Pass Results

The PassResults object receives RPC command results from the data server and passes the data packets directly through to the requesting client object without disturbing the TDS packet.

The PassResults object accepts the following input parameters:

srvProcPtr—A pointer to the thread control structure.

cmdPtr—A pointer to the command control structure.

The PassResults object provides no information to standard output or the DDS Error Handler.

The PassResults object returns CS_SUCCEED or CS_FAIL.

Process Status Message

The ProcStatusMsg object reads the return status code from a remote data server and returns the status to the client. The calling object is responsible for sending the serve send done to the client.

The ProcStatusMsg object accepts the following input parameters:

srvProcPtr—A pointer to the thread control structure.

cmdPtr—A pointer to the command control structure.

The ProcStatusMsg object provides no information to standard output or the DDS Error Handler.

The ProcStatusMsg object returns CS_SUCCEED or CS_FAIL.

Send Results

The SendResults object processes data server(s) result sets that satisfy a client's request from one or more remote data servers. The calling object is responsible for sending the client the appropriate Serve MORE and the final Send Done to the client depending on the completion level of the client request.

The SendResults object accepts the following input parameters:

srvProcPtr—A pointer to the thread control structure.

cmdPtr—A pointer to the command control structure.

cmdType—An integer representing the command type, CS_RPC_CMD.

fintCtlPtr—A pointer to the format control structure.

The SendResults object provides no information to standard output or the DDS Error Handler.

The SendResults object returns an integer −1 when an error condition exists or the number of rows processed.

DDS Registered Procedures

Several registered procedures have been developed to support administrative functionality for the DDS Open Servers.

Open Server Shutdown Features

The shutdown registered procedure, OsShutdown, provides a system administration tool that gracefully shuts down an open server application. A password is required from the command line to shutdown the open server. The OsShutdown registered procedure checks for any active RPC requests running against the DDS and returns control back to the systems administrator without shutting down the Open Server.

An active RPC request is defined as a client issuing an RPC request for service through a DDS.

If there are no active RPC requests, the OsShutdown registered procedure initiates the shut down of the specified DDS. The registered procedure accesses a globally defined DDS server table to obtain the valid password for the specified. DDS and validates the password against the SA provided password. If the password is valid, the registered procedure issues a stop event that shuts down the Open Server. If the password is invalid, a message is logged to the error handler and returns control to the SA without printing a message to standard output.

Upon receiving the shutdown request, the registered procedure locks out any additional client request connections into the DDS Open Server application.

Monitor Log Feature

The monitor log registered procedure provides a mechanism that allows a client application to monitor the error and informational data being displayed in the DDS. The registered procedure, rp_mon_log,—log, allows a client application to make a request to a DDS Open Server to monitor the log file activity of the specified DDS. The registered procedure utilizes several error handler member functions to determine if any other user is monitoring the log activity, to register the requesting client thread with exclusive access to the monitoring functionality and a means to relinquish control of the monitoring functionality. The registered procedure call requires a valid password for the DDS and a time slice (in seconds) to monitor log activity. The log monitoring functionality permits only a single client thread to access the monitoring functionality at any given time and relinquishes control of the monitoring functionality when their time slice has expired. The client application can interrupt the monitoring activity Iy dropping their connection to the DDS Open Server.

Monitor RPC Performance Registered Procedure

The monitor RPC performance registered procedure provides a mechanism whereby a client application can monitor RPC performance either near real-time or historically. The two different types of monitoring can be initiated using Sybase-RPC's.

The registered procedure will do near realtime reporting of RPC execution times when the @rpcoption parameter is equal to the string "ALL" or is a string containing a list of RPC's to be monitored. "ALL" is the default behavior for @rpcoption, so it need not be passed as an argument. The procedure will return to the monitoring client the RPC name, RPC client spid, and the RPC's execution time for a duration of num_seconds. Because all of this RPC information is being passed to rp_mon rpc via a message queues, only 1 near real-time monitoring session may run at a time.

The actual processing of the RPC information for near real-time monitoring is performed by the global MonRPCMsgQ object named G_monRPCMsgQ which is intanitated prior to the srv_runO for the DDS. The RPC handler instantiates a MonRPC object each time an RPC is being run, and a pointer to that object is what is put on the queue when the near real-time monitoring is active and the RPC is one being monitored. The activation and polling of the message queue as well as the sending of results is all performed by G_monRPCMsgQ→RunMsgQO.

The cumulative average monitor can be run by more than one monitoring client at a time because it merely parses and orders information contained in the global Xrefdatatbl procList. All this processing is performed by a TopRPCList object. This registered procedure ensures that the number of elements in the top list does not exceed the number of elements in the proclist so that no memory is wasted. All the processing needed to return result rows to the client is contained in the TopRPCList object's member functions. The client will receive rows containing the RPC name, the cumulative number of executions of the RPC, and the average execution time for the RPC.

The only argument to the rp_mon_rpcO function is the SRV_PROC*, which is needed by the G_monRPCMsgQ→RunMsgQO for activating the message queue and ensuring only one monitor is polling the message queue at a time. Both G_monRPCMsgQ→RunMsgQO and the TopRPCList constructor need the SRV_PROC* to be able to send result rows and messages back to the monitoring client.

A set of data flat files is maintained to support the non-database related data needed by the DDS. A discussion of each of these files as well as their purpose and structure follows.

Data Server Name File Definition

The server name file, servers.dat, is used to store all of the available Data Server names that support the SMS. The DDS extracts the server names from this file and builds internal tables for quick delivery of server names to the requesting code. The server name data file contains three attributes, the Server Names, the system administrator's ID, and a password. Each type of server is separated by a Server Type identifier. The Server attributes and the Server Type identifier must be logically grouped together within the file. The password attribute is used to shut down the Open Servers in a graceful manner.

DDS Configuration File Definition

The DDS Configuration file contains configuration information that is used by the open server to set the Open Server properties on the startup of the DDS Open Server. The configuration parameters are specified in the file.

Stored Procedure Requirements

The following stored procedures are required to retrieve the data from the Xref Server. The data returned is used to populate the appropriate Xref data tables.

Stored Procedure Name - LP_GET_PROC_LIST - Retrieves a list of procedure names and related information.
Logical Table Name - procedure_list
Location - XRef Server
Procedure Type - Group
Database - xref
Input Parameters - Nothing or a valid stored procedure name
Output Values - A list of the attributes of the store procedure(s)
Procedure Text - As follows:
    create procedure lp_get_proc_list@pname char(30) = "%"
    as
    begin
        select      procedure_name,
                    group_name,
                    procedure_type,
                    dtp_code,
                    argument_position,
                    rule_name,
                    server_name,
                    database_name
        from        procedure list
        where       procedure_name like @pname
        sort by     procedure_name
    end
Stored Procedure Name - LP_GET_RULE_LIST -
Retrieves a list of rule names and related information.
Logical Table Names - rule_boundary and server_list
Location - XRef Server
Procedure Type - Group
Database - xref
Input Parameters - Nothing or a valid rule name
Output Values - A list of the attributes of the store procedure(s)
Procedure Text - As follows:
    create procedure lp_get_rule_list @rule_name char(30) = "%"
    as
    begin
        select      rule_name,
                    low_value,
                    high_value,
                    r.server_name
        from        rule_boundary r, server_lists
        where       r.server_name = s.server_name
                    and
                    rule_name like @rule_name
        sort by     rule_name, low_value
    end
Procedure Name - LP_GET_SEV_LIST - Retrieves a list of server names and related information.
Logical Table Name - server_list and server_group
Location - XRef Server
Procedure Type - Group
Database - xref
Input Parameters - Nothing or a valid stored procedure name
Output Values - A list of the attributes of the store procedure(s)
Procedure Text - As follows:
    create procedure lp_get_server_list @sname char(30) = "%"
    as
    begin
        select      server_name,
                    warm_server,
                    s.group_name
        from        server_list s, server_group sg
        where       s.group_name = sg.group_name
                    and
                    s.server_name like @sname
        sort by     s.group_name, s.server_name
    end
LP_GET_PROC_COUNT - Retrieves a count of the number of -continued

```
procedures
stored on the XRef Database.
Logical Table Name - procedure_list
Location - XRef Server
Procedure Type - Group
Database - xref
Input Parameters - Nothing
Output Values - A count of all the store procedures
Procedure Text - As follows:
    create procedure lp_get_proc_cnt
    as
    begin
        select      count(*)
        from        procedure_list
    end
LP-GET_RULE_COUNT - Retrieves a count of the number of rules
stored on the XREF Database.
Logical Table Name -server_list and rule_boundary
Location - XRef Server
Procedure Type - Group
Database - xref
Input Parameters - Nothing
Output Values - A count of all the rules
Procedure Text - As follows:
    create procedure lp_get_rule_count
    as
    begin
        select      count(*)
        from        rule_boundary r, server_list s
        where       r.server_name = s.server_name
    end
LP_GET_SERVER_COUNT - Retrieves a count of the
number of servers
stored on the XRef Database.
Logical Table Name - server_list and server_group
Location - XRef Server
Procedure Type - Group
Database - xref
Input Parameters - Nothing
Output Values - A count of all the servers
Procedure Text - As follows:
    create procedure lp_get_server_count
    as
    begin
        select      count(*)
        from        server_list s, server_group sg
        where       s.group_name = sg.group_name
    end
LP_GET_SRVGRP-COUNT-Retrieves a count of the number of server
groups stored on the XRef Database.
Logical Table Name - server–group
Location - XRef Server
Procedure Type - Group
Database - xref
Input Parameters - Nothing
Output Values - A count of all the server groups
Procedure Text - As follows:
    create procedure lp_get_srvgrp_count
    as
    begin
        select      count(*)
        from        server_group
    end
```

EXAMPLE

Next discussed is a specific example of one possible implementation of the current invention. In the following discussion, it is assumed that the invention operates in a billing environment whereby customer account information may be updated and/or queried. It is to be understood that the example is but one of numerous applications whereby the benefits of the architecture and functionality of the current invention may be exploited. FIG. 5 shows three servers and a sample of records contained on each. It is to be understood that in a typical implementation there will be a large number of records on each of the servers. In addition, while the figure shows customer, product and promotion records, it is certainly possible to include other record types such as, for example, records related to operator statistics, marketing information, pay per view usage and availability, customer feedback and the like.

In the example, Server A contains two customer records (one for Joe Smith and one for Red Purcell), a product record and a promotions record. Server B contains two more customer records as well as the same product and promotions records as contained on Server A. As described above, the customer records, in the preferred embodiment, are distributed horizontally and the product and promotion records are distributed vertically. Finally, on Server C. there are two more customer records and, again, the same product and promotion records as those contained on Servers A and B.

The customer records in FIG. 5 contain various information about the customer and his or her account. In a typical implementation, there would be much more data. In the example, the first item listed is a customer number. In the preferred embodiment, each customer record corresponds to a unique customer number. Next, the customer name is listed followed by the customer's birthdate. Also included is the customer's telephone number, the services subscribed to, and any recent pay per view activity as well as the associated cost. Finally, a code for the cable operator location for the subscriber is included.

In the first example, it is assumed that a customer service representative wishes to determine the current monthly payment for Joe Smith. The CSR, sitting at a transaction generator, would enter the name Joe Smith and a query for the monthly payment. In the operation of the SMS system, the request would be sent to the DDS through the use of a stored procedure. For example, the stored procedure for retrieving an account balance may be SPI. This stored procedure requires an argument specifying the customer number so that the correct record may be queried.

Since all that is known is the last name of the customer, a prior query locating the customer number for the customer would be performed first. Once the customer number is returned and available to the client, the stored procedure SP1 with the customer number as an argument is transmitted to the DDS. In this case, the associated account number for Joe Smith is 100014. Thus, the client would submit the following stored procedure request to the DDS:

SP1 100014

In one embodiment of the present invention a call to an XREF Server would be made to determine the particular server containing the record for the proper Joe Smith. In this case, the result set from the XREF Server would specify that the desired record is contained on Server A. In a second embodiment, the DDS itself maintains one or more internal tables which indicate, based upon a particular customer number, the server containing the associated data.

In either case, the stored procedure is translated at the DDS level into SQL commands recognizable to the data servers containing the data. In the example, the command stream generated by the DDS is transmitted to Server A which executes the commands and returns the record for Joe Smith through the DDS, in passthrough mode, to the requesting client. The record, including the monthly payment, is then displayed in an easily readable format at the CSR's terminal.

The data request described above is termed SPECIFIC request. This means that the data requested is contained only on a particular server and that server must be used in the execution of the query.

As a second example, suppose that an administrator, operating at a CSR terminal, wishes to review the various HBO offerings in the system. As described above, the BOS34A operator's HBO product is contained upon each of the servers in the system. In addition, although not shown, various other operator's HBO products would also be distributed over each of the servers. Thus, the requested data may be processed according to an ANY request. In this case the stored procedure may be SP2 with an argument of HBO. In this example, once the DDS associates SP2 as a stored procedure that may be executed as an ANY request, it selects any one of the servers. The server may be selected either at random or according to any particular scheme known in the art (i.e. determining the least busy server).

Another example may be a request by an administrator for all customers that are served by the AZ67E cable operator. In this example, these customer records are distributed over two of the servers (Server A and Server C) and in practice, the records could potentially be contained on any of the servers. Thus, all of the servers must be queried for this type of request. As such, this type of request is termed an ALL request. In this case, assuming the stored procedure for retrieving each of the customer records matching a particular characteristic (e.g. AZ67E operator), is SP3, the request would be:

SP3 AZ67E the argument AZ67E referring to the cable operator serving the customer. The DDS would process this stored procedure by sending the appropriate SQL commands to each of the servers in turn (or in parallel), collating the results and returning the ultimate result set to the requesting client.

The above examples are all query (read) examples. As an example of an update request, suppose an administrator wishes to add a new promotion to the SMS system. Further, suppose he or she desires to add the ESPN record shown in FIG. 5 to all of the data servers. In this case, the client sends an SP4 stored procedure request as follows:

SP4 Promotion ESPN FREE_INSTALL

The DDS will then cause each of the servers, through an ALL request, to add the new promotion. The FREE_INSTALL argument will necessarily pass information associated with the particular promotion. For example and in this case, the order date and the participating operator will be specified.

Alternatively, the promotion record may be placed upon all SMS servers by performing an ALL request and then replicating the record throughout the system as part of a background task. In a preferred embodiment of this alternative, the ANY request will be directed to the "primary server" which will replicate the information.

A method and apparatus for achieving high transaction rates in a distributed database environment has been described above. As a result of such description, the advantages of the present invention will be apparent to those skilled in the art. While the invention has been described in conjunction with preferred embodiments, it is evident that numerous alternatives, modifications, variations and uses will be apparent to those skilled in the art in light of the foregoing description.

We claim:

1. A distributed database system comprising:

transaction generator means for generating database transactions;

a plurality of data servers; and data directory server means in communication with said transaction generator means and each of said data servers, said data directory server means receiving database transactions from said transaction generator means and selecting at least one data server for processing each said database transaction.

2. The system of claim 1 wherein said data directory server means determines the type of database transaction received and determines whether the received database transaction is processed by a specific data server, by any data server or by all data servers.

3. The system of claim 1 further comprising at least one cross-reference server, said cross-reference servers providing data location information to said data directory servers.

4. The system of claim 3 wherein said cross-reference servers further provide a rules base to said data directory servers.

5. The system of claim 1 further comprising a control application, said control application initiating and modifying a rules base implemented by said data directory servers.

6. The system of claim 1 wherein said database transactions are routed by said data directory server based upon a transaction type.

7. The system of claim 6 wherein said transaction types consist of Specific, Any and All.

8. The system of claim 6 wherein said data server for processing each said database transaction is further selected based upon transaction arguments.

9. The system of claim 1 wherein at least one of said transaction generators comprises an automatic response unit.

10. The system of claim 9 wherein said transaction unit comprising an automatic response unit further includes an automatic number indicator for determining caller telephone numbers.

11. The system of claim 1 wherein said transaction generators comprise personal computers.

12. The system of claim 1 wherein said data servers and said data directory servers comprise open servers.

13. A subscriber management system for processing subscriber account records comprising:

a plurality of client terminals for operation by a customer service representative for initiating database transactions:

a plurality of servers for storing said subscriber account records and allowing read and write access to said subscriber account records: and at least one data directory server for determining which of said servers is to be accessed for processing said database transactions, said data directory server being in communication with each of said client terminals and each of said servers;

further comprising at least one cross reference server, said cross reference servers indicating each of the accessible servers in said subscriber management system.

14. The subscriber management system of claim 13 wherein said cross reference servers farther indicate rule boundary information binding particular database transactions to particular servers.

* * * * *